March 25, 1941. O. C. GILMORE 2,235,925
APPARATUS FOR PHOTOGRAPHIC PRINTING BY PROJECTION
Filed May 25, 1939 7 Sheets-Sheet 1
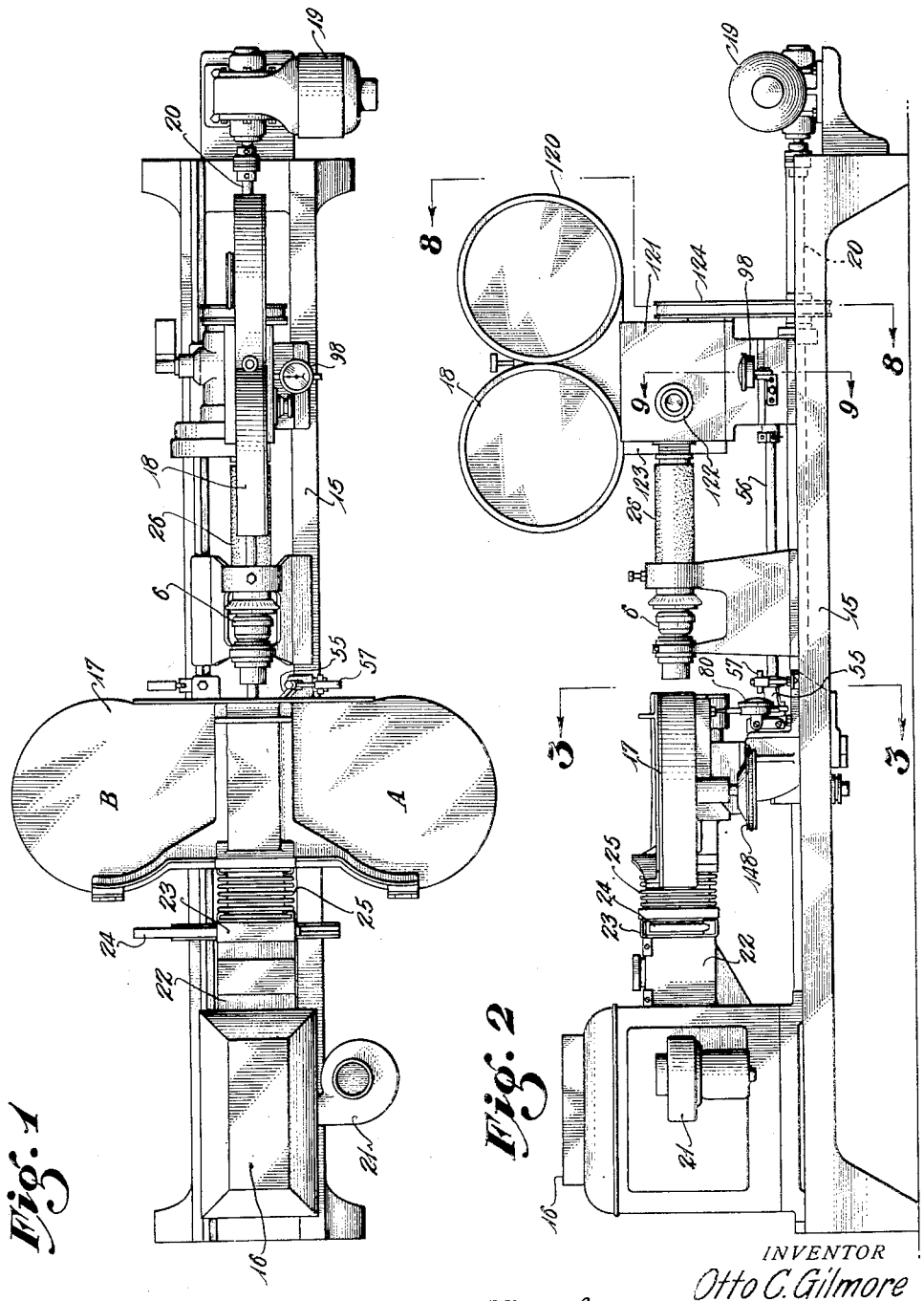
INVENTOR
Otto C. Gilmore
BY Stevens and Davis
ATTORNEYS

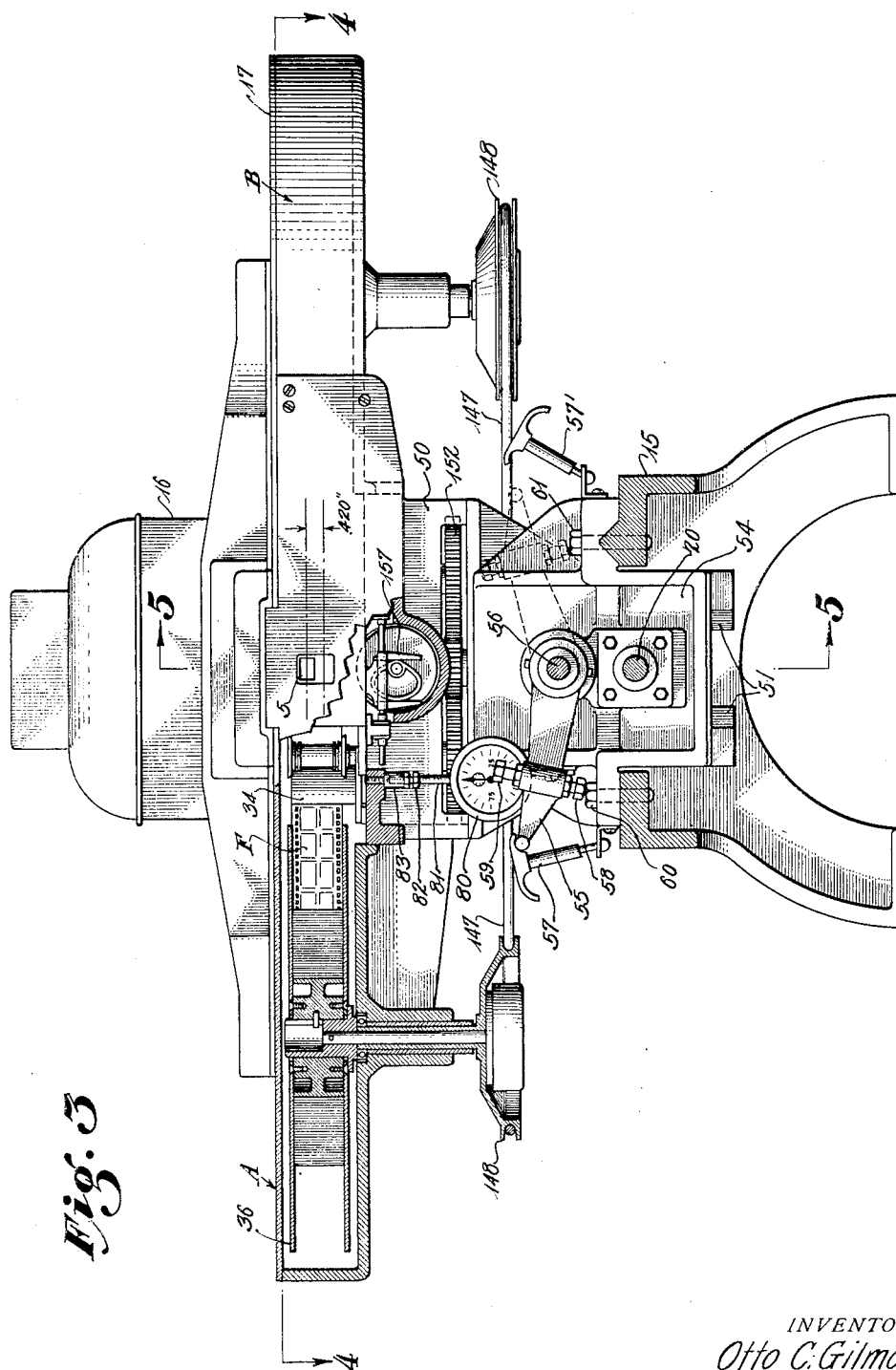

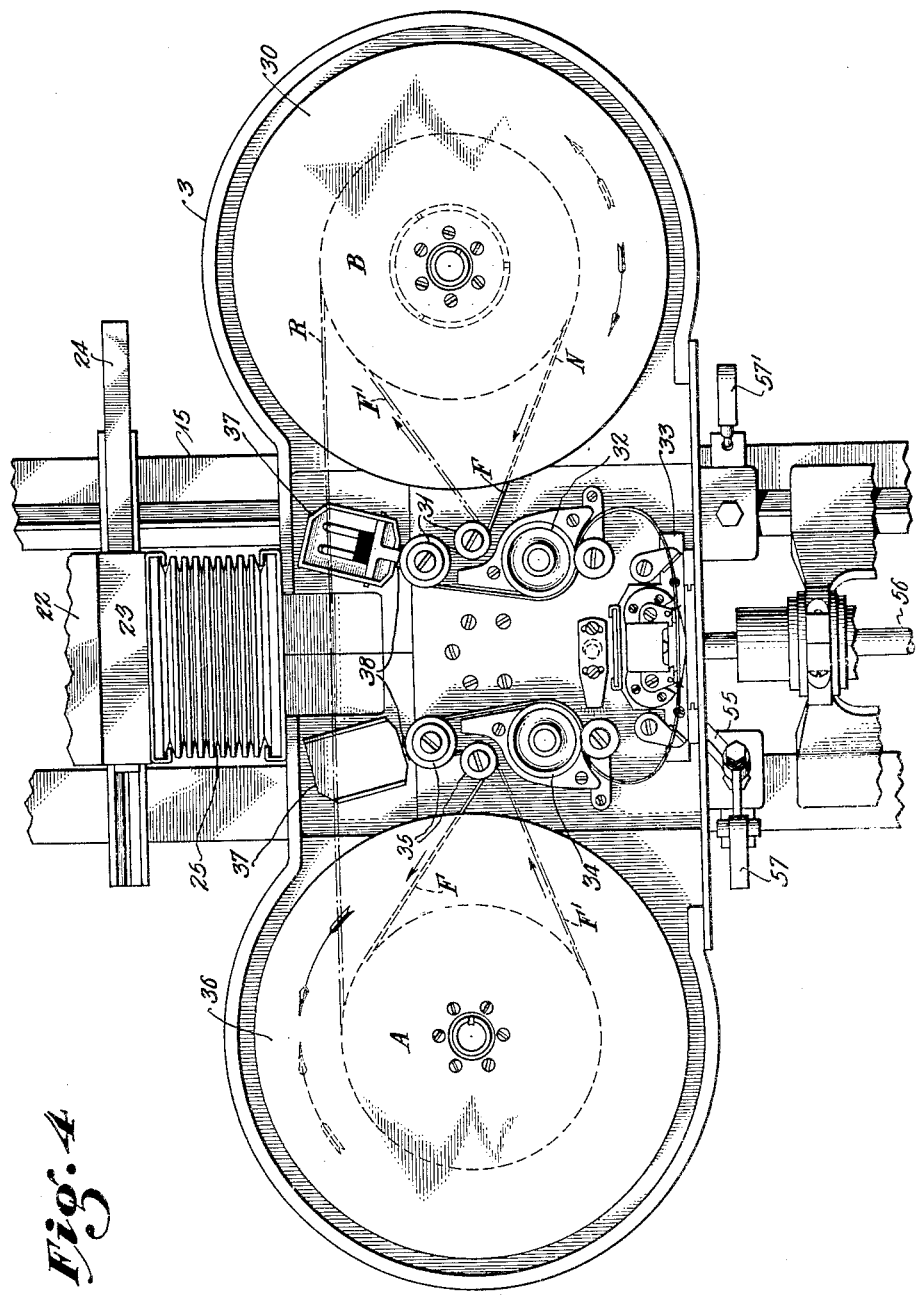

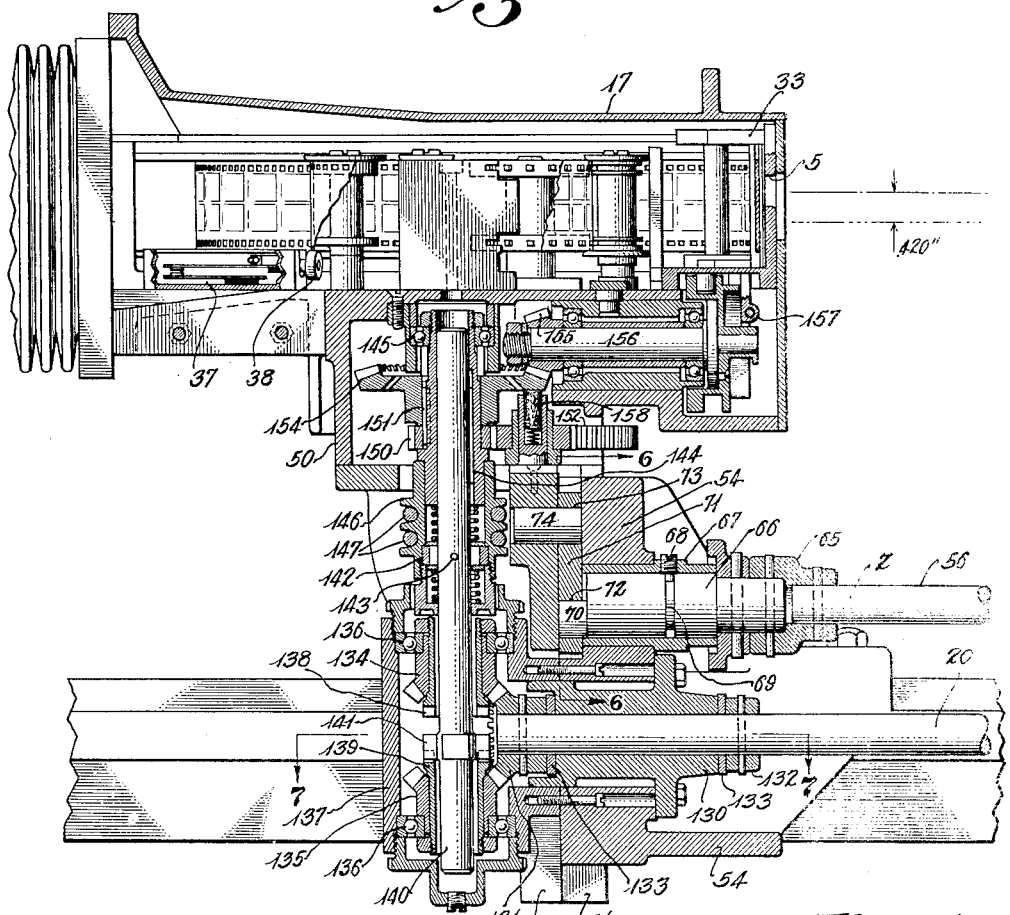

INVENTOR
Otto C. Gilmore
BY Stevens and Davis
ATTORNEYS

March 25, 1941.  O. C. GILMORE  2,235,925
APPARATUS FOR PHOTOGRAPHIC PRINTING BY PROJECTION
Filed May 25, 1939   7 Sheets-Sheet 7
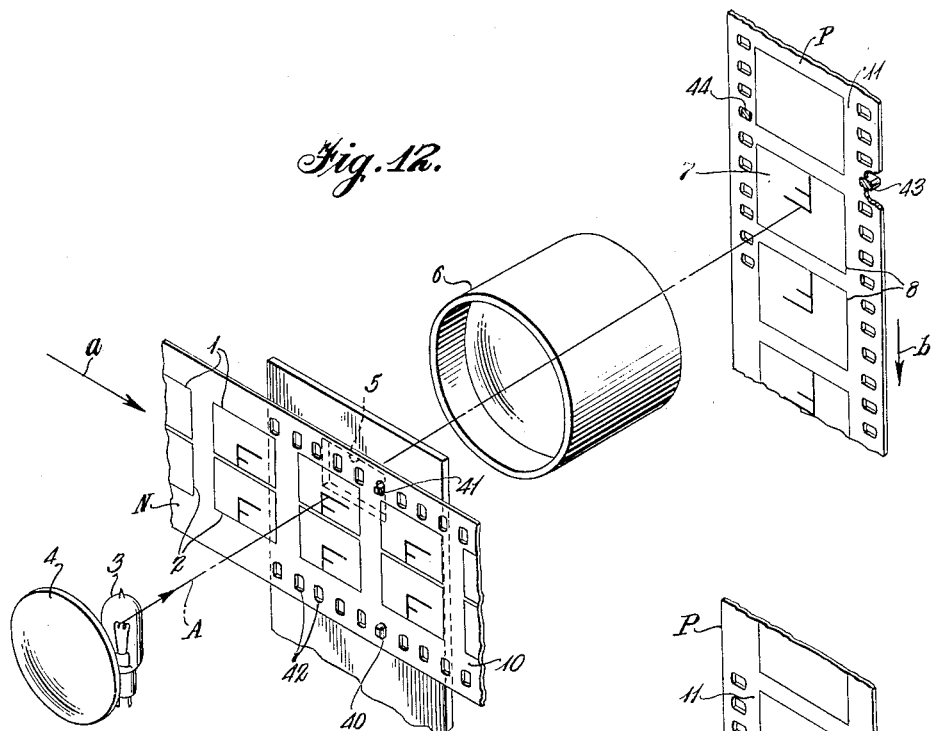
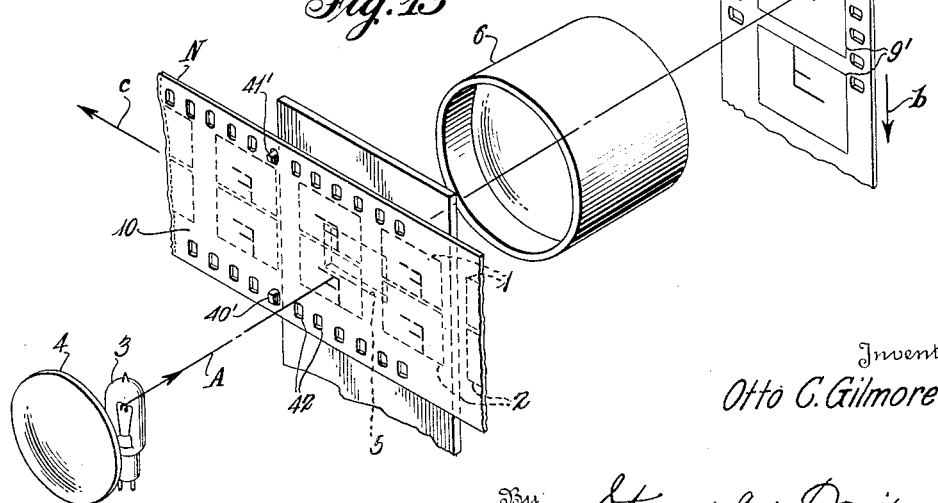
Inventor
Otto C. Gilmore
By Stevens and Davis
Attorneys Patented Mar. 25, 1941

2,235,925

UNITED STATES PATENT OFFICE 2,235,925

APPARATUS FOR PHOTOGRAPHIC PRINTING BY PROJECTION

Otto C. Gilmore, Van Nuys, Calif., assignor to Cosmocolor Corporation, New York, N. Y., a corporation of Delaware Application May 25, 1939, Serial No. 275,752

10 Claims. (Cl. 88—24)

This invention relates to the art of color photography and more especially to a projection printing device and method whereby full size prints may be made from films which carry two smaller images in each frame arranged in side by side relation with the images turned on their sides.

The patented art reveals many examples of projection printing devices that would theoretically perform the necessary operation of taking the small images from one film and printing them in accurate registry and in an enlarged state on another film. Some patents such as the British Patent to Croad No. 343,892 completely accepted February 20, 1931, and the United States Patent to Shaw No. 1,592,908 issued July 20, 1926, disclose mechanically complicated devices for turning the film over so that an image may be projected on first one side and then the other, while other patents such as the United States Patent to Pilny et al. No. 1,802,530 issued April 28, 1931, show optically complex devices for directing light through devious paths so as to simultaneously record upon both sides of the film being printed.

In attempting to use any of the devices of the prior art, however, great difficulty is experienced in actually getting the images into accurate registry and the whole success of the various processes depends upon the accomplishment of this difficult feat. In the mechanical devices adjustment is difficult to maintain as parts wear and quickly become sufficiently loosened to throw the images out of registry. In optical devices such as shown by Pilny et al., a large proportion of the light is lost in the numerous prisms that must be used to reflect the light through such devious paths. Consequently, it is practically impossible to balance the prism system accurately enough to get the images into exact registry and with the light intensities properly proportioned.

As a result of these difficulties, and after repeated attempts to overcome them, it has been found that they can be overcome and the smaller images from a two-image film can be projected into full size on another film or plurality of films in such a way as to make the projected images register very accurately and very regularly, in a practically fool-proof manner and with a very simple and economical device as compared with the devices heretofore proposed.

An essential feature of this new device is a fixed lens system including apertures at the projecting and receiving film and a lens or lenses between them, which system is not changed at all during the projection printing operation. Using this device the two films are then passed across their respective apertures while the necessary printing light is passed therethrough. The apertures are so arranged that on first passage of the films across them only one of the two images on each frame of the film to be printed is projected and printed on the receiving film. The films are then repassed across the apertures in reverse positions so that the other image of each pair on the film being printed is projected onto the other emulsion on the receiving film.

In a modified form of the invention, the images may be received on two separate films and the final film prepared therefrom by contact printing. Thus the process can be applied either to directly printing on a double emulsion film or to the printing of intermediate prints from which the final print may be made by contact printing.

In order to make a practical device that will accommodate the present day films which have a sound track along one side it has been necessary to provide means for adjusting the relative positions of the films as they pass their respective apertures so as to compensate for the presence of the sound track. This has been done and a number of other features which add greatly to the convenience and simplicity of operation thereof have also been incorporated in the preferred device for the practice of this invention.

The novel features that are considered characteristic of the present invention are set forth with particularity in the appended claims. The invention itself, however, both as to its organization and its method of operation, together with additional objects and advantages thereof, is best understood from the following description of specific embodiments thereof, when read in conjunction with the accompanying drawings in which:

Figure 1 is a plan view of a complete projection printing apparatus arranged according to the present invention;

Figure 2 is a side view in elevation of a complete projection printing apparatus;

Figure 3 is a view in cross section through the apparatus taken on line 3—3 of Figure 2, showing the negative projection head in elevation, portions thereof being broken away to show the interior of the chamber;

Figure 4 is a plan view of the negative film chamber, the cover thereof being removed to show the interior;

Figure 5 is a view in cross section taken on line 5—5 of Figure 3, showing portions of the interior of the negative chamber and the mechanism for moving and operating this chamber;

Figure 6 is a view in cross section taken on line 6—6 of Figure 5;

Figure 7 is a view in cross section taken on line 7—7 of Figure 5;

Figure 12 is a diagrammatic view in perspective illustrating one phase of the process of the invention; and Figure 13 is a diagrammatic view in perspective illustrating the second phase of the process of the invention.

Figure 8:
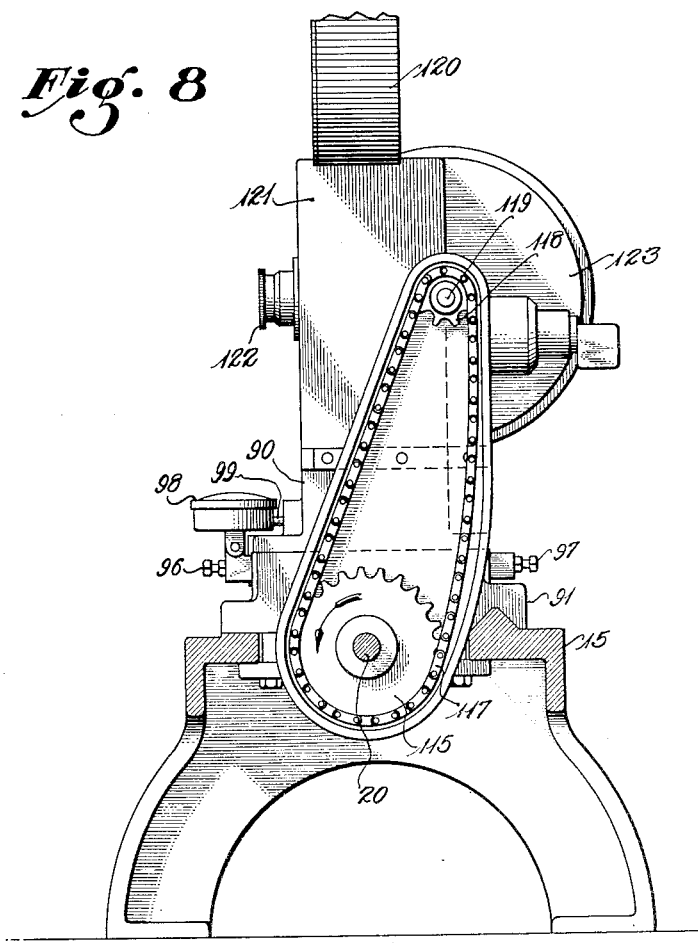
Figure 8 is a view in cross section of the apparatus taken on line 8—8 of Figure 2, showing the positive film camera and driving mechanism in elevation.

In order to more readily understand the essence of the invention, reference will be had to Figures 12 and 13, wherein it may be seen that the negative film N has images recorded in pairs thereon. Each pair of images on this negative film N occupies the area normally covered by a single exposure frame, the images lying in side by side relation and turned through 90° so as to lie on their sides. Such a negative film may be produced according to the process and apparatus disclosed in Reissue Patent No. 20,678 issued March 29, 1938, and United States Patent No. 2,137,570 issued November 22, 1938, to the present inventor. Each of the images 1 comprises components which are complementary in color to the other images 2 of each pair. For instance, the images 1 may comprise the blue-green components, whereas the images 2 may comprise orange-red components. In printing positive images, the negative film N may be passed through a projection apparatus including a lamp 3, reflector 4, exposure aperture 5, and objective 6, is all positioned upon a fixed optical axis A. It will be noticed that in Figure 12 the negative film N is positioned, so that the blue images 1 are passed through the optical axis A for projection, whereas in Figure 13 the negative film N is shifted laterally with respect to itself, so that the red images 2 intersect the optical axis A for projection.

The chief object of the present invention, specifically, is the printing of the pairs of negative images 1 and 2 in registration upon opposite sides of a double emulsion positive film P. As the negative images 1 and 2 are arranged longitudinally of the negative film N, and the positive images are arranged laterally of the positive film P in the normal position, the two films are arranged to travel through paths which lie at right angles to each other so as to accomplish the turning of the images in a simple manner and without the necessity of complicated mechanical or optical equipment.

In order to simplify the printing operation, the process is divided into two phases. Accordingly, in the first phase, the light beam projected along the optical axis A by the lamp 3 and reflector 4 passes through a blue image 1 and through the projection aperture 5 to the objective 6, whereupon the image is focused upon a blue-green emulsion 7 on one side of the positive film P. When all of the blue component images 1 have been printed as positive images 8 upon the emulsion 7 of the positive film P, the films are then rewound and turned around to present their opposite sides toward each other. In other words, whereas the support side of the negative faces the lens, while the blue-green component images 1 are being printed upon the blue-green emulsion 7 of the positive film P, in the second phase of the process the emulsion side of the negative film N is positioned near the objective 6 and the orange-red emulsion 9 on the other side of the positive film P is presented for this printing operation.

During the second phase of the process the negative film N is not only turned around but it is also shifted laterally so as to present the orange-red component images 2 in the optical axis A, so that these images may be projected by the light beam produced by the lamp 3 and reflector 4, and be focused by the objective 6 upon the fresh emulsion 9 of the positive film P. It is to be noted that the negative film N is turned around and not just turned over. That is, the sound track 10 is always positioned along the same edge of the film N, the lower edge in the present illustration, and the images 1 and 2 are always in the same vertical position but reversed in their lateral direction.

As it is necessary to leave one portion 11 of the positive film unaffected so that a sound track may be printed thereon, it is likewise necessary to shift the positive film P laterally between the phases of the process so as to leave this area 11 free and to record the images in exact register. Consequently, whereas the sound track area 11 appears on the right side of the face of the positive film P during the first phase of the process, as shown in Figure 12, this sound track area 11 appears on the left side of the face of the film P, when said film P is turned around for the second phase of the process.

In addition to turning the films over to present the opposite sides of each film toward the lens, it is also necessary to reverse the direction in which the films are transported. For instance, during the first phase of the operation, when the negative images 1 are being printed upon the positive film P, the negative film N is advanced toward the right as indicated by the arrow a and the positive film P is advanced downwardly as indicated by the arrow b. After all of the images 1 have been recorded upon the positive film P, both the negative and positive films are then rewound and turned around to present their opposite sides for the second phase of the printing operation. The negative film N is then run through the printer in the opposite direction to that which it travelled during the first phase, as indicated by the arrow c, whereas the positive film P is advanced in the same direction as during the first phase, as indicated by the arrow b.

In order to accomplish the hereinbefore described process in a foolproof manner, mechanical means has been provided that will accurately position films and print the images in registry. Referring specifically to Figures 1 and 2, there is shown a projection printing apparatus comprising a base 15, a lamp-house 16, at one end of said base, a negative film magazine 17, the objective 6, and a positive film camera 18 located near the opposite end of said base 15. A motor 19 is mounted on the end of the base 15 opposite the lamp-house 16, which motor 19 drives a shaft 20, for operating the film advancing mechanism. A blower 21 is mounted on one side of the lamp-house 16 to cool the lamp 3 therein, which is preferably a 1000-watt prefocused lamp. A housing 22 in communication with the lamp-house 16 may contain a condenser comprising conventional plano-convex condensing lenses mounted on each side of a standard water cell.

The housing 22 and a filter holder 23 may be positioned between the lamp-house 16 and the negative film magazine 17, the filter holder 23 containing a movable color filter 24. The filter holder 23 may be mounted upon the end of the condenser housing 22 and may be connected with the negative film magazine 17 by a bellows 25. The objective 6 is preferably a four inch copying lens having an f4.5 opening and a flexible lens tube 26 may connect the objective 6 with the positive film magazine 18. The projection system comprises the lamp-house 16, condenser holder 22, filter holder 23, objective 6, all mounted upon the optical axis A which is fixed with respect to the apparatus, these parts along with the supports for the film magazines all being fixed in their respective positions upon the base 15.

As best shown in Figure 4, at the start of the process the negative film N is wound upon a reel 30 positioned in one end of the negative film magazine 17 and is passed through a path indicated by the letter F. In this first phase of the process during which the blue-green component images are printed, the film N is taken off the front of the film roll on the reel 30, passed over idler rollers 31, past a sprocket 32, and to a shuttle 33. This shuttle 33 may be of a standard well-known type and is located right at the exposure aperture 5 in the magazine 17. After passing through the shuttle 33, the film N is then advanced by a sprocket 34 and over idler rollers 35 to be wound upon a take-up reel 36. As the film N is wound upon the supply reel 30 with the emulsion toward the inside, the emulsion will be away from the objective 6 as it is advanced through the shuttle 33 past the exposure aperture 5.

The film N is wound upon this take-up reel 36 in the opposite direction than that in which it was removed from the supply reel 30. That is, whereas the film N wound upon the supply reel 30 has the emulsion toward the inner side, the film N is wound upon the take-up reel 36 with the emulsion toward the outside of the roll. When the first phase is completed, that is, all of the blue-green images are printed upon the positive film P, the negative film N is then passed straight back to the supply reel 30 over a path R and rewound upon said reel with the emulsion toward the outside. Upon being rewound, the film supply reel 30 and the take-up reel 36 are interchanged, and the film N passed back through the advancing means through a path F'. In this manner the emulsion side of the negative film N is presented toward the objective 6, while the images are still maintained in the same upright position, that is, the sound track 10 upon the negative film N is positioned along the lower edge of the film N during both phases. In order to compensate for light changes from scene to scene in the negative film N conventional light change switches 37 are provided with film contacting rollers 38 adapted to cooperate with notches in the edge of the film N in the usual manner.

It should be noted at this point that different shuttles are used during the two phases of the process. The shuttle 33 which is used during the first phase of the process is provided with a pair of registering pins, as best shown in Figure 12. These registering pins comprise a large pin 40 and a small pin 41. The large pin 40 is of substantially the same size and configuration as the film perforations 42, whereas the small pin 41 is reduced in its lateral dimension so as to accommodate any slight changes in the dimensions of the film such as shrinkage or expansion. This arrangement of registering pins is well-known in the art and is commonly used in standard makes of motion picture apparatus.

In the present process, however, a modified form of shuttle is required during the second phase due to the fact that the films are turned around. It will be seen in Figure 12 that the registering pins 40 and 41 are adapted to mesh with the opposed perforations 42 which are located adjacent the left edges of the images 1 and 2, the large pin residing in the lower perforations beside the film track area 10. In contrast, it will be seen in Figure 13 that the registering pins 40' and 41' are adapted to cooperate with the perforations 42 which are adjacent the right edges of the inverted images 1 and 2, the large pin 40' still being located at the lower side of the shuttle 33'. In this manner, the images are exactly registered so that they will be properly superimposed upon projection.

Correspondingly different shuttles are also used in connection with the positive films P in the positive film magazines 18. In the first phase of the process a large pin 43 is located so as to engage the perforations on the right-hand side of the film P adjacent the sound track 11, and a small pin 44 is located on the left-hand side thereof. These pins 43 and 44 are arranged to cooperate with film perforations 45 adjacent the bottom edges of the image frames 8. During the second phase a different shuttle is used, however, on which the pins are reversed in their positions. The large pin 43' is located on the left-hand side and the small pin 44' on the right-hand side.

The pins 43' and 44' are likewise adapted to cooperate with the film perforations 45 which are located adjacent the lower edges of the image frames 8. It will be noted that although the pins are reversed in their positions between the two phases, due to the fact that the positive film P is turned over, the large pins 43 and 43' are both positioned adjacent the sound track area 11. It will be understood from the above description that the positive images will be in exact register. The large pins in all instances are adjacent the sound track areas, and the pins are located in line with the same edges of the images during both phases of the process.

As has been heretofore described, both the negative film N and the positive film P have to be shifted laterally with respect to the individual films in order that the superposed positive images may be in exact register. For convenience of construction and operation the negative film magazine 17 is arranged in a horizontal position and adapted to be shifted vertically, and the positive film magazine 18 is arranged in a vertical position and adapted to be shifted laterally in a horizontal line. The vertical shift of the negative film magazine 17 amounts to exactly .420 of an inch which represents the center distance between the two negative images 1 and 2 of each pair. The lateral horizontal shift of the positive film magazine 18 amounts to exactly .110 of an inch which represents the width of the standard sound track. The center of these shifting movements which controls the register of the horizontal lines on the negative image and the vertical lines on the positive print represents the fixed optical axis A of the entire optical system.

The mechanism for accomplishing the vertical shift of the negative film magazine 17 may best be seen in Figures 3 and 5. The negative magazine 17 is mounted upon a movable upright support 50 which is provided with vertical extensions having slideways 51. The slideways 51 have a sliding tongue-and-groove engagement 52 with an extending tongue 53 carried by a stationary support 54 which is fixed on the base 15. A vertical movement is accomplished by a cam action between the stationary support 54 and the movable support 50 which is operated by a lever 55 mounted upon a shaft 56. As best shown in Figure 3 the lever 55 may be swung from a left-hand position, shown in full lines, to a right-hand position, shown in broken lines.

This lever 55 may be locked in either position by resilient hooks 57 and 57', and the limits of the movement of the lever may be accurately controlled by means of adjustable abutments in the form of bolts 58 and 59 which are threaded into the lever at a right-angle tangent to its axis of rotation. The bolt 58 may be threaded into or out of its seat within the arm 55 so as to cooperate with a suitable abutment such as a head of a bolt 60 which may also be employed for fixing the support 54 to the base 15. Similarly, the bolt 59 may be threaded into or out of its socket within the lever 55 to cooperate with an abutment such as bolt 61 on the opposite side of the support 54.

The lever 55 is fixed to the shaft 56 which may be secured in axial alignment with a shaft 66 by means of a coupling 65. The shaft 66 is mounted in a sleeve 67 which is carried by the fixed support 54, and is pivotally secured within said sleeve 67 by means of a screw 68 which cooperates with a circumferential slot 69. This shaft 66 carries an eccentrically located shaft 70 on its inner end opposite the shaft 56. The eccentric shaft 70 pivotally supports a link 71, said shaft extending through a bearing 72 in the lower end of said link 71. A similar bearing 73 is located in the support end of the link 71 and is adapted to receive a pin 74 carried by the movable magazine support 50. Accordingly, as the lever 55 is swung between its limits, the shafts 56 and 66 will be pivoted, whereupon the eccentric shaft 70 will be swung through its eccentric path, and thereby raise or lower the link 71 which in turn raises or lowers the movable support 50 and negative magazine 17, by means of the bearing 73 and pin 74.

The shifting of the apparatus may be accurately registered by mechanical means so that the operator may always be assured of predetermined adjustments without having to resort to difficult computations. A meter 80 of well-known type may be mounted on the fixed support 54. This meter should be one which can be read to 1/10,000 of an inch. This meter is preferably provided with a plunger 81 which may be reciprocated to operate the indicating hand of the meter with respect to the meter dial. An abutment such as screw 82, threaded into a seat 83 carried by the movable support 50, may be arranged to cooperate with the plunger 81.

In order that the meter 80 may accurately indicate the adjustment of the mechanism, the screw 59, carried by the lever 55, must first be adjusted so that the center of the orange red component images 2 and the exposure aperture 5 exactly coincides with the optical axis A. When this adjustment is made certain the screw 82 may then be adjusted so that the indicating hand of the meter 80 lies exactly at zero on the meter dial. In shifting the apparatus the lever 55 may then be swung until the meter indicates a movement of exactly .420 of an inch, whereupon the screw 58, carried by the lever 55, may then be adjusted to prevent further movement.

Figure 9:
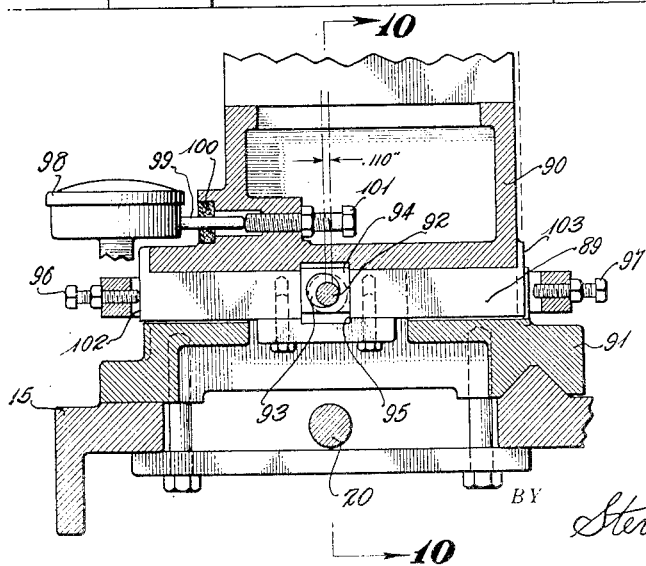
Figure 9 is a view in cross section taken on line 9—9 of Figure 2, showing the adjusting mechanism for the positive film camera.
Figure 10:
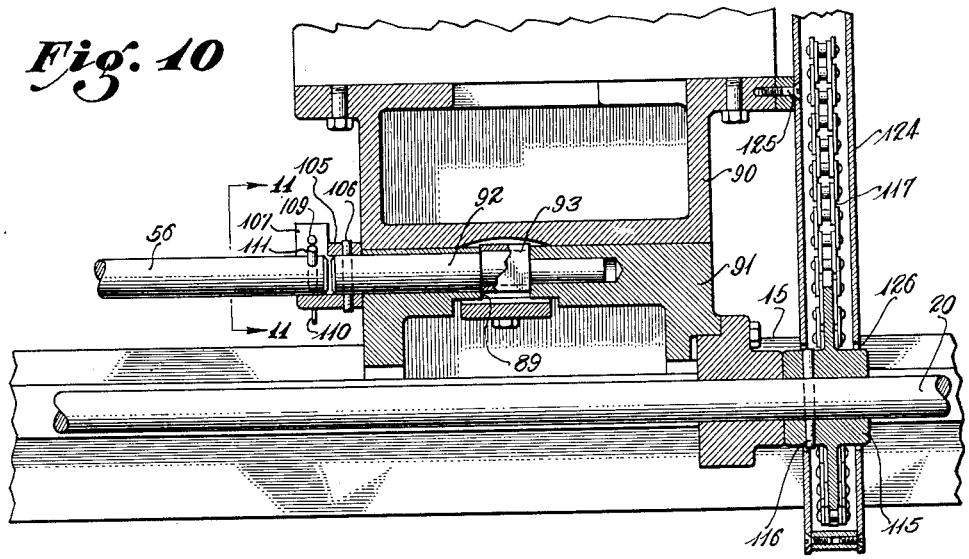
Figure 10 is a view in cross section taken on line 10—10 of Figure 9.

The horizontal lateral shift of the positive film magazine 18 may be simultaneously effected by means of the lever 55. As best seen in Figure 2, the shaft 56, upon which the lever 55 is fixed, extends parallelly of the base 15 to the supporing structure of the positive film magazine 18. As best shown in Figures 9 and 10, the positive film magazine 18 may be mounted upon a movable support 90 which may be mounted by means of a slideway 89, upon a stationary support 91 fixed to the base 15. A shaft 92 may be pivotally mounted within the stationary support 91 and operatively connected to the shaft 56 in axial relation by means of a coupling 105. The shaft 92 carries an eccentric 93 which is seated within a follower 94. The follower 94 rides within an opening 95 in the movable support 90, which opening 95 permits the follower 94 free vertical movement which will be caused by the rotation of the eccentric 93. The vertical walls of the opening 95, however, engage the vertical surfaces of the follower 94 so that any horizontal movement of the follower 94 will immediately effect the shifting of the movable support 90.

The horizontal shifting of the movable support 90 may be accurately adjusted in a manner similar to that employed with respect to the negative film magazine 17. As best shown in Figure 9, the movable support 90 may be limited in its lateral movement by means of abutments such as the screws 96 and 97 and accurately gauged as to its movements by means of the meter 98. The meter 98 may be identical with the meter 80 both of which should be capable of registering movements of .0001 of an inch. The meter 98 may be operated by a reciprocal plunger 99 which may extend through a washer 100 to engage an abutment such as a screw 101, having threaded engagement with the movable support 90. The movable support 90 may be adjusted so that the vertical centers of the image frames 8 and 9' of the positive film P coincide with the optical axis A.

The screw 97, which is threaded through a portion of the fixed support 91, may be adjusted to abut the adjacent surface 103 of the movable support 90. When this position has been fixed, the screw 101 may then be adjusted to actuate the plunger 99 until the indicating hand of the meter 98 exactly coincides with zero on the meter dial. When the adjustment of the meter has been completed, the magazine 18 and movable support 90 may then be shifted on the stationary support 91 until the meter reads exactly .110 of an inch. The screw 96, which is likewise carried by a portion of the stationary support 91, may then be adjusted to abut the surface 102 of the movable support 90, and thereby limit the movement of the support 90 to exactly the width of the standard sound track.

After these adjustments are horizontally made, the apparatus is then ready for operation. The lever 55 may then be swung to the position shown in full lines in Figure 3, whereupon meters 80 and 98 will register exactly .420 and .110 respectively and the centers of the blue-green negative images 1 and the positive image frames 9 will exactly coincide with the optical axis A. After the completion of the first phase of the process the films may be rewound and reversed as heretofore described for the second phase of the process. The lever 55 may then be swung to its opposite extremity, as shown by dotted lines in Figure 3, and locked into position by the resilient hook 57'. The movable supports of the magazines will thereby be adjusted so that the meters 80 and 98 will read exactly zero. In these positions the negative magazine 17 will be raised so that the centers of the negative images 2 will coincide with the optical axis A, and the positive magazine 18 will be shifted laterally so that the centers of the image frames 9' will exactly coincide with said optical axis A.

Figure 11:
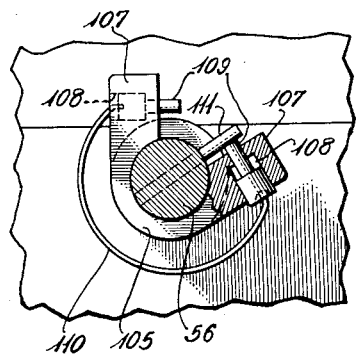
Figure 11 is a view in cross section taken on line 11—11 of Figure 10.

As the movement of the negative film magazine 17 is considerably greater than the movement of the positive film magazine 18, various methods of compensation may be employed. For instance, the cam actions may be computed, the actions of the cams may be controlled by gear mechanism, or other means may be used. In order to simplify the adjusting mechanism, however, it is preferred to limit the movements by means of adjustable abutments, as heretofore described and to compensate for the movement through the coupling 105 which may best be seen in Figure 11. The shaft 56 must necessarily travel through a greater angle than required of the shaft 92. Accordingly, the coupling 105 may be fixed to the shaft 92 by means of a pin 106, but may be resiliently connected to the shaft 56.

The coupling 105 is provided with arms 107 extending angularly therefrom and having seats 108 therein to receive plungers 109. The plungers 109 are secured to the opposite ends of a curled spring 110. The shaft 56 is provided with a pin 111 which extends between the arms 107 of the coupling 105 and is aligned with the plungers 109. As the shaft 56 is rotated by the lever 55 the pin 111 will be moved from one extremity to the other and engage the plungers 109. Due to the strength of the spring 110, the coupling will follow the shaft 56 and thereby rotate the shaft 92 and the cam 93 which will effect the shifting of the movable support 90. When the support 90 is moved through its limit, the spring 110 will absorb the further movement of the pin 111 and the shaft 56, thereby compensating for the difference in movement required by the two magazines and permitting the adjustment by the same mechanism.

As a single source of power is used for operating the film driving mechanism in the film magazines, it is also necessary to provide compensating means within the driving mechanism to accommodate the movement of the magazine. The motor 19 is preferably a synchronous motor to insure a uniform drive of the shaft 20. This shaft 20 extends parallelly to the base 15, past the positive film magazine 18 to the negative film magazine 17. At a point adjacent the positive film magazine 18, a sprocket 115 is fixed to the shaft 20 by a pin 116. This sprocket 115 engages a chain 117 which in turn engages a sprocket 118 fixed to the magazine drive shaft 119. As the magazine 18 may be of a standard type including reel chambers 120, an exposure and driving mechanism chamber 121, a focusing microscope 122, and a shutter housing 123, the details of the internal mechanism are not shown. The driving chain 117 has sufficient slack therein to permit lateral movements of the magazine drive shaft 119 without further compensation. The chain drive 117 is provided with a protective housing 124 which may be mounted upon the shiftable housing 90 by a screw 125. The housing is adapted to accommodate the movements of the magazine by means of enlarged openings 126 around the hubs of the sprockets 115 and 118.

The end of the drive shaft 20 is mounted in a bearing 130 carried by the fixed support 54 for the negative magazine 17. A beveled gear 131 is pinned on the extremity of the shaft 20 adjacent the bearing 130 and a collar 132 is pinned to the shaft 20 adjacent the opposite end of the bearing 130, dampening washers 133 being located between the ends of the bearing 130 and the gear 131 and the collar 132 to prevent play in the shaft 20 and absorb vibration. The beveled gear 131 meshes with two opposed beveled gears 134 and 135 which are mounted in ball races 136, supported by a housing 137 carried by the stationary support 54. The beveled gears 134 and 135 are axially aligned upon a vertical axis, are in the form of sleeves, and have sleeve gears 138 and 139 fixed therein respectively. The sleeve gears 138 and 139 are adapted to receive a vertical drive shaft 140 centrally thereof, and are provided with longitudinally extending gear segments adapted to mesh with segments 141 carried by said shaft 140.

The shaft 140 is located in a sleeve 142 by means of a pin 143, and fixed therein by a key 144. The sleeve 142 is carried by means of a movable support 50 and is provided with pulleys 146. The pulleys 146 frictionally engage belts 147 for driving pulleys 148 connected to the shafts within the magazine 17 upon which the film reels 30 and 36 are mounted. A gear 150 is likewise mounted on a sleeve 142, and fixed by means of a key 151. The gear 150 meshes with a gear train 152 which drives the shafts upon which the film sprockets 32 and 34 are mounted. A beveled gear 154 is also secured to the sleeve 142 by the key 151 which meshes with a beveled gear 155 mounted upon a shaft 156 which is adapted to operate the film advancing mechanism 157 and shuttle 33. The film advancing mechanism may be conventional in type and is not shown in detail. A gear sound dampener 158 may be located between the gear train 152 and the beveled gear 154.

When the negative film magazine 17 is elevated and arranged to project the orange-red component images 2, the movable support 50 carries with it the sleeve 142 and vertical drive shaft 140, in which event the gear segments 141 carried by the shaft 140 engage the segments of the gear 138 and will be driven in one direction. When the mechanism is lowered so as to project the blue-green component images 1, the gear segments 141 of the shaft 140 are dropped down into engagement with the segments of the gear 139 and will consequently be driven in the opposite direction. The opposed direction of drive may be readily understood in view of the fact that the gears 138 and 139 are carried by the beveled gears 134 and 135 respectively which engage opposed segments of the beveled gear 131 mounted upon the drive shaft 20.

The hereinbefore described photographic printing apparatus is specifically designed for the production of standard 35 mm. color substractive prints from pairs of sub-standard negative images in which the registration of the images is accurately accomplished by mechanical movements of the film magazines with respect to the optical axis. The movements of the film magazines are governed by gauges so that the operator can consistently make prints day after day from the original negative without making visual or photographic adjustments. The operator may entirely depend upon the mechanics of the apparatus, gauges, and stop-blocks for proper accuracy.

The pairs of sub-standard negative images may occupy the space of a single frame of a standard picture, each individual image being .405 of an inch by .557 of an inch. By means of this apparatus the sub-standard frames are enlarged 1.558 times to fill the standard camera aperture which is .631 of an inch by .868 of an inch. Upon projection, this image is shown through an aperture which is .600 of an inch by .825 of an inch. It has been found by actual practice that the results of the hereinbefore described method and apparatus are dependable and show controlled register within the close limits of .0001 of an inch.

The hereinbefore described printer is in commercial operation making direct prints in color from sub-standard negatives photographed under standard studio conditions. The method of printing is as follows: The operator places a supply reel 30, on which is wound a 1000 foot roll of negative film N, in the negative film magazine 17. The negative film N is threaded through the path F' which is the position for printing the orange red component images 2 which, for subtractive printing lie next to the sound track. The shuttle 33 which carries the aperture for the orange red component images 2 is locked in the mechanism. The shift lever 55 is thrown to the right, away from the operator, which elevates the negative film magazine 17 and engages the drive mechanism so that the film is advanced from the operator's side to the other side of the apparatus. This position is indicated on the gauge 80 as zero.

Double coated or duplitized positive film P is then threaded in the positive film magazine 18 which is shifted through its limits to an indicated zero on the gauge 98. The negative and positive mechanisms are, at all times, in synchronous relationship to each other so that when an image is being projected from the negative N, which is positioned by registration pins 40' and 41' in the shuttle 33, it is being recorded on the positive film P, which is positioned by the registration pins 43' and 44', thus insuring accurate register. The negative starting image is indicated by a punch mark and a like mark is placed on the start of the positive film P, and the emulsion of the double coated film P which is being exposed. These operations being carried out, the motor 19 is started and the print is made, image by image, from the red components of the original negative N.

After the red components are recorded, the negative film N is rewound on the reel 30 which is interchanged with the take up reel 36 and threaded through the path F and a different shuttle 33 which carries the aperture plate for the green image and the registration pins 40 and 41, so that the same perforations engage the registration pins 40 and 41 exactly as when the film was originally exposed. The shift lever 55 is drawn toward the operator, as shown in Figure 3, which draws the negative film magazine 17 downward, the operator being careful that this distance of .420 of an inch is accurately shown on the gauge 80. The movement of the lever 55 shifts the gears so that the negative film N will move in an opposite direction. The emulsion is now away from the objective 6 and the green image, which is the one farthest away from the sound track 10, is in the exact optical axis A. The positive film P is rewound with the emulsion reversed, so that when the operator places it in the magazine 18, the unexposed side of the double coated film P is toward the objective 6 and in the proper position to receive the enlarged green images.

The negative film N and positive film P are placed in synchronization by means of the original punch marks. The positive film magazine 18 has been shifted horizontally toward the operator exactly .110 of an inch as shown on the gauge 98, whereupon the center of the exposure aperture in the positive film magazine 18 is located on the optical axis. The shuttle of the magazine 18 has been changed so that the registration pins 43 and 44 are in opposed positions so that the same perforations in the positive film P rest upon the same registration pins. The operator now starts the motor 19 and all of the green images I of the original negative N are projected and printed on the opposite side of the double coated film P from the red image which were printed during the first operation. After complete exposure the double coated film P is ready for processing in any laboratory equipped for color work. After the printing of the film P, the images and emulsions thereof may be toned, dyed or otherwise provided with color so that the finished film may be projected in the usual manner by the use of standard equipment. It will be understood that separate films may be exposed, in place of the double coated film P, and these separate films may be used for making prints by contact. The operation is exactly the same in every respect.

Although certain specific embodiments of the present invention have been shown and described, many modifications thereof are possible according to the specific need of each case. The invention, therefore, is not to be restricted except insofar as is necessitated by the prior art and by the spirit of the appended claims.

This is a continuation-in-part of application Serial No. 94,972, filed August 8, 1936, by the present applicant.

Application Serial Number 308,079 was filed on December 7, 1939 by this applicant for the purpose of claiming the method of printing herein described.

I claim:

1. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, power means for driving said film advancing means, means for projecting a series of images from said first film to said second film to be recorded thereon, means for rewinding said films, said films being rethreaded in said magazines with their opposite sides toward the exposure apertures, means for adjusting said first magazine to intersect the optical axis with the other image of each pair, means for adjusting the second magazine to register the newly projected images with the images recorded thereon, means for projecting said second series of images from said first film to the said second film to be recorded thereon, means for advancing said first film in an opposite direction, means for advancing said second film in the same direction, and power means for driving said film advancing means.

2. A photographic motion picture printing apparatus which comprises in combination, means for advancing film bearing images in pairs within a magazine having an exposure aperture therein, means for positioning each image of said film with respect to said exposure aperture, means for positioning said magazine so that one image of each pair is passed through the optical axis of the apparatus, means for advancing an unexposed double emulsion film through a second magazine having an exposure aperture therein, means for positioning each image area of said film with respect to said exposure aperture, means for positioning said second magazine so that the film passes through said optical axis, power means for driving said film advancing means, means for projecting a series of images from said first film to said second film to be recorded in a first emulsion thereon, means for rewinding said films, said films being rethreaded in said magazines with their opposite sides toward the exposure apertures, means for positioning each other image of each pair with respect to the exposure aperture in said first magazine, means for adjusting said first magazine to intersect the optical axis with the other image of each pair, means for positioning each image area of the second emulsion of said second film with respect to the exposure aperture of said second magazine, means for adjusting the second magazine to register the newly projected images with the images recorded thereon, means for projecting said second series of images from said first film to the said second film to be recorded thereon, means for advancing said first film in an opposite direction, means for advancing said second film in the same direction, and power means for driving said film advancing means.

3. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, power means for driving said film advancing means, means for projecting a series of images from said first film to said second film to be recorded thereon, means for rewinding said films, said films being rethreaded in said magazines with their opposite sides toward the exposure apertures, means for adjusting said first magazine to intersect the optical axis with the other image of each pair, means for adjusting the second magazine to register the newly projected images with the images recorded thereon, control means for effecting the adjustment of said magazines, means for projecting said second series of images from said first film to the said second film to be recorded thereon, means for advancing said first film in an opposite direction, means for advancing said second film in the same direction, and power means for driving said film advancing means.

4. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, power means for driving said film advancing means, means for projecting a series of images from said first film to said second film to be recorded thereon, means for rewinding said films, said films being rethreaded in said magazines with their opposite sides toward the exposure apertures, means for shifting said first magazine laterally to intersect the optical axis with the other image of each pair, means for shifting the second magazine laterally to register the newly projected images with the images recorded thereon, control means for effecting the shifting of said magazines, means for projecting said second series of images from said first film to the said second film to be recorded thereon, means for advancing said first film in an opposite direction, means for advancing said second film in the same direction, and power means for driving said film advancing means.

5. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, means for projecting a series of images from said first film to said second film to be recorded thereon, means for rewinding said films, said films being rethreaded in said magazines with their opposite sides toward the exposure apertures, means for adjusting said first magazine to intersect the optical axis with the other image of each pair, means for adjusting the second magazine to register the newly projected images with the images recorded thereon, means for projecting said second series of images from said first film to the said second film to be recorded thereon, means for advancing said first film in an opposite direction, means for advancing said second film in the same direction, power means for driving said film advancing means, and means for adjusting said driving means to accommodate the adjustment of said magazines.

6. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, means for projecting a series of images from said first film to said second film to be recorded thereon, means for rewinding said films, said films being rethreaded in said magazines with their opposite sides toward the exposure apertures, means for adjusting said first magazine to intersect the optical axis with the other image of each pair, means for adjusting the second magazine to register the newly projected images with the images recorded thereon, means for projecting said second series of images from said first film to the said second film to be recorded thereon, means for advancing said first film in an opposite direction, means for advancing said second film in the same direction, power means for driving said film advancing means, and means for adjusting said driving means to accommodate the change of direction in advancing said first film.

7. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, means for projecting a series of images from said first film to said second film to be recorded thereon, means for rewinding said films, said films being rethreaded in said magazines with their opposite sides toward the exposure apertures, means for adjusting said first magazine to intersect the optical axis with the other image of each pair, means for adjusting the second magazine to register the newly projected images with the images recorded thereon, means for projecting said second series of images from said first film to the said second film to be recorded thereon, means for advancing said first film in an opposite direction, means for advancing said second film in the same direction, power means for driving said film advancing means, and means for adjusting said driving means to accommodate the adjustment of said magazines and the change of direction in advancing said first film.

8. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, means for projecting a series of images from said first film to said second film to be recorded thereon, means for rewinding said films, said films being rethreaded in said magazines with their opposite sides toward the exposure apertures, means for shifting said first magazine laterally a predetermined distance to intersect the optical axis with the other image of each pair, means for shifting the second magazine laterally a predetermined distance differing from that of the first magazine, to register the newly projected images with the images recorded thereon, control means for effecting the shifting of said magazines, means associated with said control means to compensate for the difference of shifting between the two magazines, means for projecting said second series of images from said first film to the said second film to be recorded thereon, means for advancing said first film in an opposite direction, means for advancing said second film in the same direction, and power means for driving said film advancing means.

9. A photographic motion picture printing apparatus which comprises in combination, means for advancing film bearing images in pairs within a magazine, means for positioning said magazine so that one image of each pair is passed through the optical axis of the apparatus, means for advancing an unexposed double emulsion film through a second magazine, means for positioning said second magazine so that the film passes through said optical axis, means for projecting a series of images from said first film to said second film to be recorded thereon, means for rewinding said films, said films being rethreaded in said magazines with their opposite sides toward the exposure apertures, means for shifting said first magazine laterally a predetermined distance to intersect the optical axis with the other image of each pair, means for shifting the second magazine laterally a predetermined distance differing from that of the first magazine, to register the newly projected images with the images recorded thereon, control means for effecting the shifting of said magazines, means associated with said control means to compensate for the difference of shifting between the two magazines, means for projecting said second series of images from said first film to the said second film to be recorded thereon, means for advancing said first film in an opposite direction, means for advancing said second film in the same direction, and power means for driving film advancing means, and means for adjusting said driving means to accommodate the adjustment of said magazines and the change of direction in advancing said first film.

10. A photographic motion picture printing apparatus which comprises in combination, means for advancing film bearing images in pairs within a magazine, having an exposure aperture therein, means for positioning each image of said film with respect to said exposure aperture, means for positioning said magazine so that one image of each pair is passed through the optical axis of the apparatus, means for advancing an unexposed double emulsion film through a second magazine having an exposure aperture therein, means for positioning each image area of said film with respect to said exposure aperture, means for positioning said second magazine so that the film passes through said optical axis, means for projecting a series of images from said first film to said second film to be recorded in a first emulsion thereon, means for rewinding said films, said films being rethreaded in said magazines with their opposite sides toward the exposure apertures, means for positioning each other image of each pair with respect to the exposure aperture in said first magazine, means for shifting said first magazine laterally a predetermined distance to intersect the optical axis with the other image of each pair, means for positioning each image area of the second emulsion of said second film with respect to the exposure aperture of said second magazine, means for shifting the second magazine laterally a predetermined distance differing from that of the first magazine to register the newly projected images with the images recorded thereon, control means for effecting the shifting of said magazines, means associated with said control means to compensate for the difference of shifting between the two magazines, means for projecting said second series of images from said first film to the said second film to be recorded thereon, means for advancing said first film in an opposite direction, means for advancing said second film in the same direction, and power means for driving said film advancing means, and means for adjusting said driving means to accommodate the adjustment of said magazines and the change of direction in advancing said first film.

OTTO C. GILMORE.